(No Model.)  2 Sheets—Sheet 1.

T. F. LYNCH.
ICE CUTTING MACHINE.

No. 460,440.  Patented Sept. 29, 1891.

WITNESSES:
Chas. Nida
C. Sedgwick

INVENTOR:
T. F. Lynch
BY Munn & Co.
ATTORNEYS (No Model.) 2 Sheets—Sheet 2.

T. F. LYNCH.
ICE CUTTING MACHINE.

No. 460,440. Patented Sept. 29, 1891.

WITNESSES:
Chas. Nida
C. Sedgwick

INVENTOR:
T. F. Lynch
BY Munn & Co.
ATTORNEYS

UNITED STATES PATENT OFFICE.

THOMAS F. LYNCH, OF PHILADELPHIA, PENNSYLVANIA.

ICE-CUTTING MACHINE.

SPECIFICATION forming part of Letters Patent No. 460,440, dated September 29, 1891.

Application filed December 22, 1890. Serial No. 375,449. (No model.)

*To all whom it may concern:*

Be it known that I, THOMAS F. LYNCH, of Philadelphia, in the county of Philadelphia and State of Pennsylvania, have invented a new and Improved Ice-Cutting Machine, of which the following is a full, clear, and exact description.

My invention relates to improvements in ice-cutting machines such as are used for cutting ice from the surfaces of ponds, lakes, &c.; and the object of my invention is to produce a simple and easily-operated machine by means of which the ice may be rapidly cut into strips and cakes of a desired size.

The invention will be hereinafter fully described, and then pointed out in the claims.

Reference is to be had to the accompanying drawings, forming a part of this specification, in which similar letters of reference indicate corresponding parts in all the figures.

Figure 1:
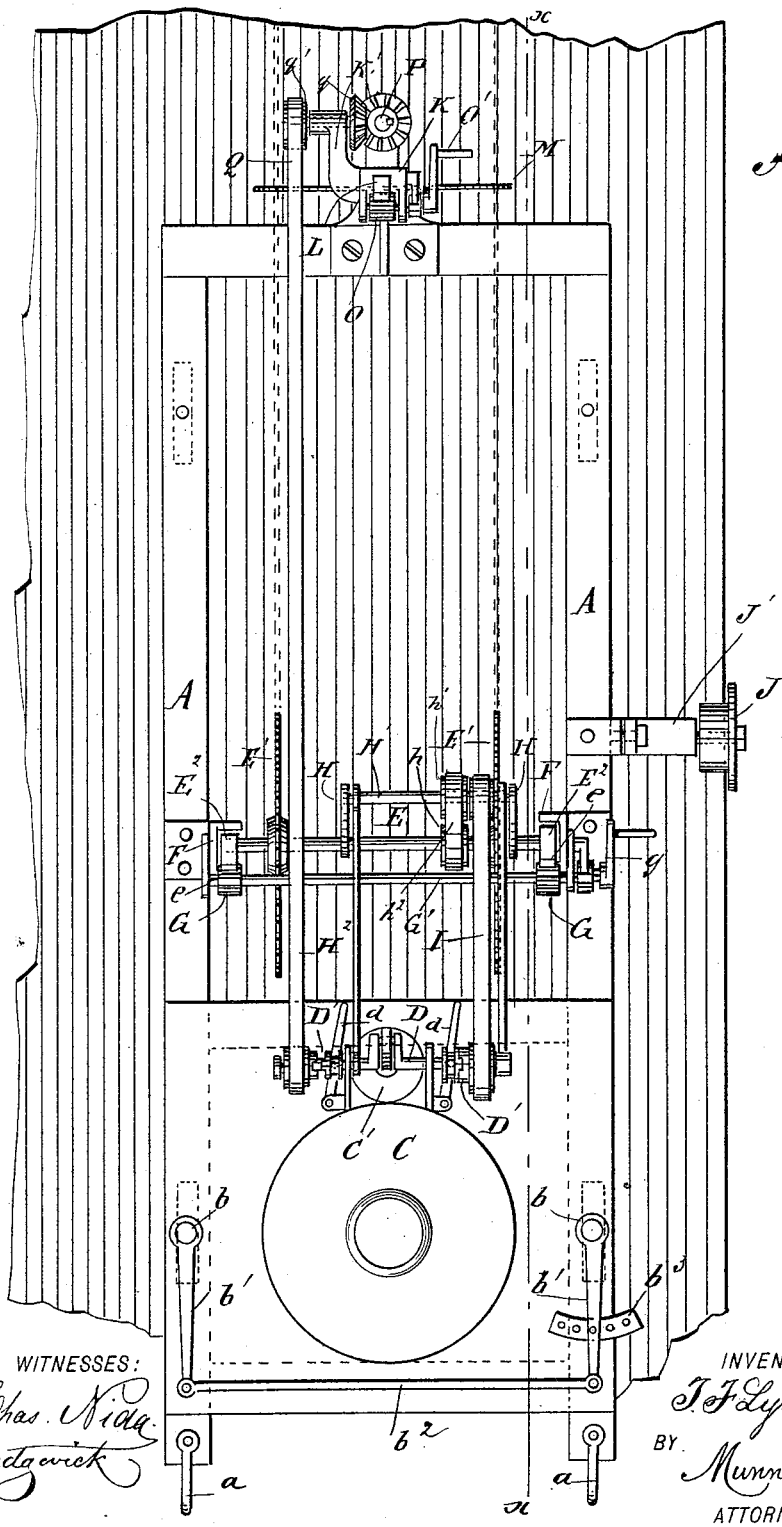
Figure 2:
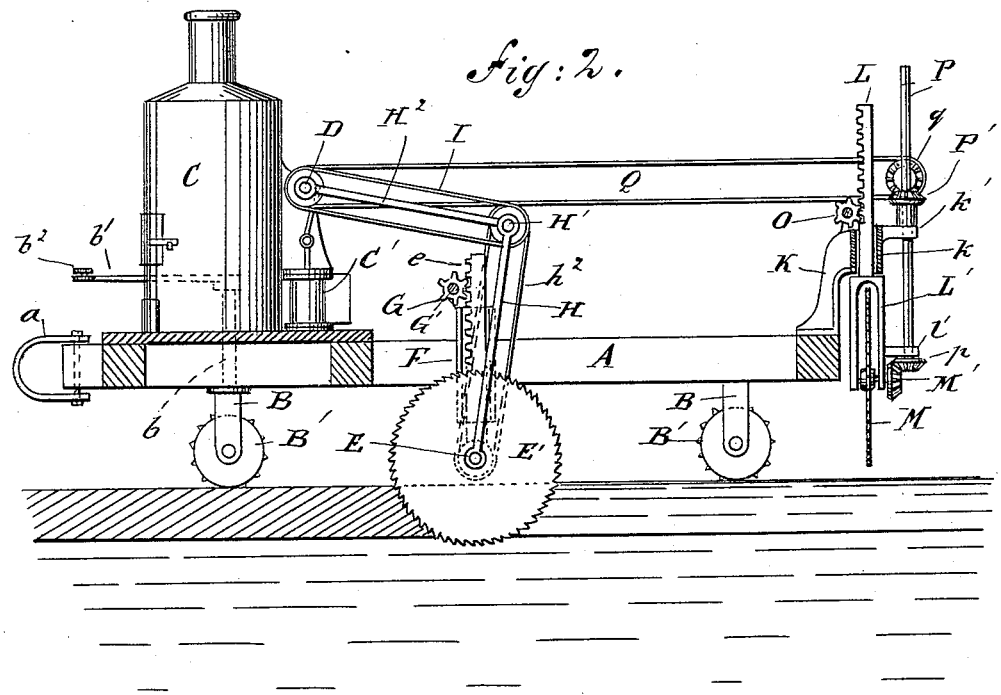
Figure 3:
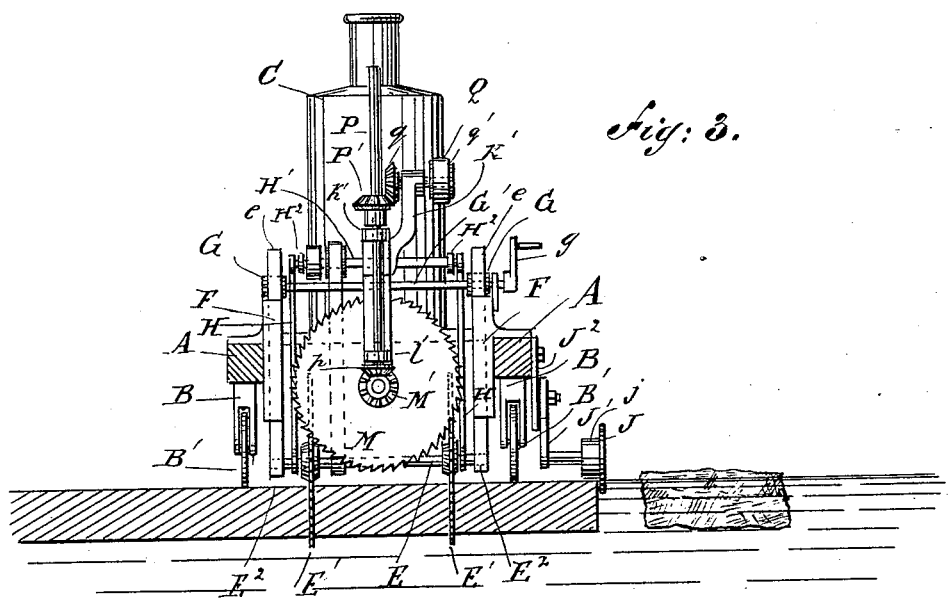

Figure 1 is a plan view of the machine embodying my invention. Fig. 2 is a longitudinal section of the same on the line $x\ x$ of Fig. 1, and Fig. 3 is a sectional end view looking from the rear.

The frame A of the machine is preferably rectangular and is provided at one end with clevises $a$, so that power may be secured to the frame to draw it over the ice; but, if desired, the frame may be propelled by the motor which is used to run the saws. The frame is provided with depending hangers B at each end, and in the lower ends of the hangers are spur-wheels B', the spurs or brads on the wheels being intended to prevent the machine from slipping laterally on the ice. The boxes of the forward wheels B' are provided with vertical shafts $b$, which extend upward through the machine-frame, as indicated by dotted lines in Fig. 2, and which at the top are provided with levers $b'$, and the levers are connected by a rod $b^2$, so that by moving the levers the wheels B' may be turned sufficiently to steer the machine. The segmental plate $b^3$, with perforations therein, is fixed to the frame beneath one of the levers $b'$, and the levers may be held in a definite position by thrusting a pin through a perforation in one of the levers and through a corresponding perforation in the plate.

The frame has a boiler C and engine C' mounted thereon to operate the saws, but I have shown the boiler and engine simply to show that it is practicable to operate the saws by power, and in practice an electric motor would probably be used, although any motor could be used, as desired.

A shaft E extends transversely beneath the machine-frame and is provided with circular saws E', which are large enough to cut through ice of any ordinary thickness, and the shaft is mounted in boxes or bearings E², secured to the lower ends of racks $e$, which are held to move vertically in the slideways F, and the racks mesh with the cog-wheels G on the shaft G', which is mounted in suitable supports above the machine-frame and is provided at one end with a crank-handle $g$, so that by turning the handle and shaft the cog-wheels and racks will also be actuated and the saws may be quickly brought to a desired height.

The saw-shaft E is connected by links H with a shaft H', which is mounted loosely in the upper ends of the links, and the shaft H' is connected by other links H² with the main driving-shaft D, which is operated by the engine C' in the ordinary way, and the shaft E has a pulley $h$, connected by a belt $h^2$ with a pulley $h'$ on the shaft H', and the shaft H' is driven by a belt I, extending over suitable pulleys on the shaft H' and on the driving-shaft D, and it will thus be seen that the belts I and $h^2$ will drive the saw-shaft and that the links H and H² will allow of the raising and lowering of the saws without interfering with their rotary motion.

I have shown the saw-shaft provided with two saws, which are placed a distance apart corresponding to the width of an ordinary cake of ice; but more saws may be provided, if desired.

A disk J is pivoted to an elbow J', which is held to a support J² on one side of the machine-frame, and the disk has on its inner side a broad bearing-surface $j$, which is adapted to run on the ice, the disk being intended to extend over the edge of the ice at a point where it has been previously cut, as best shown in Fig. 3, and thus serve as a guide for the machine. The elbow J' is hinged to the support J², so that when necessary the elbow may be swung upward and the disk be raised from the ice.

On the rear end of the machine is a bracket K, which has an opening $k$ extending vertically through its upper end, and a rack L is mounted to slide in the opening $k$, the rack terminating at its lower end in a bracket L', which carries a saw M, the saw being arranged at right angles to the saws E' and being intended to cut the strips of ice made by the operation of the saws E' into blocks. A cog-wheel O is pivoted in the path of the rack L, so as to mesh therewith, and the shaft of the cog-wheel is provided with a crank-handle O', so that by turning the cog-wheel the rack may be moved vertically and the saw M brought into a desired position.

The saw-shaft on which the saw M is mounted has a gear-wheel M' at one end, which gear-wheel meshes with a gear-wheel $p$ on the lower end of the vertical shaft P, which is mounted in projecting lugs $l'$ $k'$, which are fixed, respectively, to the bracket L' and the bracket K, and above the lug or arm $k'$ is a gear-wheel P', through which the shaft P extends, and the shaft is keyed to the gear-wheel, so that both will turn together, but not tightly enough so but that the shaft will move vertically through the gear-wheel. A gear-wheel $q$ meshes with the gear-wheel P', the said gear-wheel being fixed to a short horizontal shaft mounted in a rearwardly-extending arm K' of the bracket K, and the opposite end of said shaft is provided with a pulley $q'$, which connects by means of a belt Q with a pulley on the main driving-shaft D. It will thus be seen that the saw M may be raised and lowered and that the gear mechanism described above will constantly drive it in whatever position it is placed.

It is obvious that the saws E' and the saw M will not need to be operated at the same time, as when the saw M is extended downward through the ice the machine cannot be advanced, and to provide for the alternate operation of the saws the main driving-shaft D is provided with clutches D' of ordinary construction, which are operated by levers $d$, so that the mechanism connected with either of the saws may be thrown into and out of gear by operating the levers. I have not shown this construction in detail, as the ordinary clutches are used, and the clutches and connections form no part of my invention.

The machine is operated as follows: The machine is dragged along the ice. The saws E are let down by means of the cog-wheels and racks described above, so that they will project through the ice, and as the machine advances the saws will cut the ice into strips. These strips may be cut into blocks afterward, or at frequent intervals the machine and saws E' may be stopped and the saw M lowered and set in operation, thus cutting off the strips.

I have shown only one of the saws M adapted to cut off a single strip of ice; but it is obvious that this part of the invention may be duplicated and the number of cutting-saws made to correspond with the stripping-saws.

I do not claim the details of the construction described above, as I have shown a particular means for raising and lowering the saws; but any suitable mechanism may be used for the same purpose.

Having thus described my invention, I claim as new and desire to secure by Letters Patent—

1. An ice-cutting machine comprising the frame, a motor thereon, a main drive-shaft operated thereby, two vertically-sliding racks mounted in ways on the frame, shafts provided with gears meshing into said racks to raise and lower them, locking devices for said shafts, strip-cutting and block-cutting circular saws journaled in the lower ends of said racks at right angles to each other, belting connecting the main drive-shaft and the shaft of the strip-forming saw, a vertically-sliding shaft P, geared at its lower end to the shaft of the block-forming saw, a bevel-gear through which said vertical shaft freely passes and connected therewith by a spline and groove, and a counter-shaft geared to said bevel-gear and belted to the drive-shaft, substantially as set forth.

2. In an ice-cutting machine, the combination, with the frame, the motor, and the main drive-shaft, of the vertically-sliding racks $e$, provided with guideways F, a saw-shaft journaled in the lower ends of said racks, a shaft G, geared to said racks and having locking devices, a shaft H' above and parallel with the saw-shaft and belted thereto and to the main drive-shaft, and links H H², supporting said shaft and in turn mounted on the main drive-shaft and the saw-shaft, substantially as set forth.

THOMAS F. LYNCH.

Witnesses:
EDWARD GROOM,
JOHN J. PARK.